(12) United States Patent
Ashjaee

(10) Patent No.: US 10,754,045 B2
(45) Date of Patent: Aug. 25, 2020

(54) CLUSTERING GNSS DATA

(71) Applicant: JAVAD GNSS, Inc., San Jose, CA (US)

(72) Inventor: Javad Ashjaee, Saratoga, CA (US)

(73) Assignee: JAVAD GNSS, INC., San Jose, CA (US)

( * ) Notice: Subject to any disclaimer, the term of this patent is extended or adjusted under 35 U.S.C. 154(b) by 342 days.

(21) Appl. No.: 15/673,124

(22) Filed: Aug. 9, 2017

(65) Prior Publication Data

US 2018/0045834 A1 Feb. 15, 2018

Related U.S. Application Data

(60) Provisional application No. 62/372,698, filed on Aug. 9, 2016.

(51) Int. Cl.
| | | |
|---|---|---|
| *G01S 19/42* | (2010.01) | |
| *G01S 19/38* | (2010.01) | |
| *G01S 19/14* | (2010.01) | |

(52) U.S. Cl.
CPC ............ *G01S 19/42* (2013.01); *G01S 19/38* (2013.01); *G01S 19/14* (2013.01)

(58) Field of Classification Search
CPC .............................. G01S 19/42; G01S 19/38
USPC ........................................ 342/357.25, 357.21
See application file for complete search history.

(56) References Cited

U.S. PATENT DOCUMENTS

| | | |
|---|---|---|
| 8,022,868 B2 | 9/2011 | Yudanov et al. |
| 8,094,087 B2 | 1/2012 | Ashjaee et al. |
| 8,120,527 B2 | 2/2012 | Ashjaee et al. |
| 8,125,376 B1 | 2/2012 | Ashjaee et al. |
| 8,169,379 B2 | 5/2012 | Zhukov et al. |
| 8,224,525 B1 | 7/2012 | Rapoport et al. |
| 8,606,498 B2 | 12/2013 | Pesterev et al. |
| 8,629,988 B2 | 1/2014 | Gribkov |
| 8,717,232 B2 | 5/2014 | Ashjaee et al. |
| 8,717,233 B2 | 5/2014 | Ashjaee et al. |
| 8,756,010 B2 * | 6/2014 | Gupta ...................... G01S 5/02 701/491 |

(Continued)

*Primary Examiner* — Chuong P Nguyen
(74) *Attorney, Agent, or Firm* — Morrison & Foerster LLP

(57) ABSTRACT

A handheld GNSS device having a GNSS antenna, memory, and a display receives a first GNSS signal at the GNSS antenna and determines a first position of a point of interest based on the GNSS signal. The first position is stored in memory. A second GNSS signal is received at the GNSS antenna and a second position of the point of interest is determined based on the second GNSS signal. The second position is stored in memory. A third GNSS signal is received at the GNSS antenna and a third position of the point of interest is determined based on the third GNSS signal. The third position is stored in memory. A determination is made whether the first, second, and third positions meet a clustering criteria. In accordance with a determination that the first, second, and third positions meet the clustering criteria, a first cluster position is stored. The first cluster position is based on the first, second, and third positions. In accordance with a determination that the first and second positions meet the clustering criteria and the third position does not meet the clustering criteria, a second cluster position is stored. The second cluster position is based on the first and second and not the third position.

12 Claims, 11 Drawing Sheets

(56) References Cited

U.S. PATENT DOCUMENTS

| | | | |
|---|---|---|---|
| 8,872,700 B2* | 10/2014 | Ashjaee | G01S 19/43 |
| | | | 342/357.23 |
| 8,975,967 B2 | 3/2015 | Ashjaee et al. | |
| 8,977,494 B2* | 3/2015 | Gupta | G01S 5/02 |
| | | | 701/489 |
| 9,103,912 B2 | 8/2015 | Yudanov et al. | |
| 9,168,946 B2 | 10/2015 | Ashjaee et al. | |
| 9,228,835 B2 | 1/2016 | Gribkov et al. | |
| 9,237,418 B2* | 1/2016 | Liu | H04W 4/029 |
| 9,250,328 B2* | 2/2016 | Ashjaee | G01C 21/005 |
| 9,671,497 B2 | 6/2017 | Ashjaee et al. | |
| 9,720,093 B2 | 8/2017 | Ashjaee | |
| 9,748,926 B2 | 8/2017 | Ashjaee et al. | |
| 9,781,572 B2* | 10/2017 | Liu | H04W 4/029 |
| 10,338,228 B2* | 7/2019 | Ashjaee | G01S 19/45 |
| 2011/0169946 A1* | 7/2011 | Rudin | G01S 5/16 |
| | | | 348/135 |
| 2012/0229333 A1 | 9/2012 | Ashjaee et al. | |
| 2012/0299936 A1 | 11/2012 | Ashjaee et al. | |
| 2013/0016006 A1 | 1/2013 | Ashjaee et al. | |
| 2014/0062778 A1 | 3/2014 | Ashjaee et al. | |
| 2015/0045058 A1* | 2/2015 | Rudow | H04W 4/029 |
| | | | 455/456.1 |
| 2015/0100269 A1 | 4/2015 | Ashjaee | |
| 2015/0116145 A1 | 4/2015 | Ashjaee | |
| 2015/0234055 A1 | 8/2015 | Ashjaee et al. | |
| 2016/0018530 A1 | 1/2016 | Ashjaee | |
| 2016/0041268 A1 | 2/2016 | Ashjaee | |
| 2016/0178368 A1* | 6/2016 | Ashjaee | G01C 11/02 |
| | | | 342/357.28 |
| 2016/0178369 A1 | 6/2016 | Ashjaee | |
| 2016/0178754 A1 | 6/2016 | Ashjaee | |
| 2017/0219715 A1 | 8/2017 | Ashjaee | |
| 2017/0293032 A1 | 10/2017 | Ashjaee | |
| 2017/0343678 A1 | 11/2017 | Ashjaee | |

* cited by examiner

| Base  | GEO  | 37°23'26.51618"N 121°54'21.12678"W | 31.8505 |
| @2010.00 | GRID | 1967796.2011 6153253.8483 | 138.8593 |
| Rover | GEO  | 37°23'28.74328"N 121°54'21.54760"W | 2.0281  |
| @2010.00 | GRID | 1968021.9353 6153223.2768 | 109.0273 |
| R-0 172°17' | 227.80 | 129.83 | |

Epochs: 50s     Sats: 7+5        2005-01-01 00:00:00
HRMS:0.007  VRMS:0.005   3dRMS:0.008  95% Conf. Ellipse
HDOP:0.749   VDOP:1.175  PDOP:1.394
ah:0.009     TDOP:0.745      GDOP:1.581
0:55°46'14....  $\sigma_1$:0.015    $\sigma_2$:0.009
ANT HGT:4.921ft JAVTRIUMPH_LSA   NONE
Point: Point2_AVG [2/6] Code: DefCode
Averaged: Point2, Point3, Point13, Point14, Point15
Project: Prj.2015-07-29 17.30.28 Page: Page2    Units:ft

CLUSTERING GNSS DATA

CROSS-REFERENCE TO RELATED APPLICATIONS

This application claims the benefit of U.S. Provisional Application No. 62/372,698, filed on Aug. 9, 2016, entitled "CLUSTERING GNSS DATA," the entire contents of which are incorporated herein by reference.

BACKGROUND

1. Field

The present disclosure relates generally to geodesy and precise positioning of a handheld geodesic device.

2. Related Art

Navigation receivers that use global navigation satellite systems, such as GPS or GLONASS (hereinafter collectively referred to as "GNSS"), enable a highly accurate determination of the position of the receiver. The satellite signals may include carrier harmonic signals that are modulated by pseudo-random binary codes and that, on the receiver side, may be used to measure the delay relative to a local reference clock. These delay measurements may be used to determine the pseudo-ranges between the receiver and the satellites. The pseudo-ranges are not true geometric ranges because the receiver's local clock may be different from the satellite onboard clocks. If the number of satellites in sight is greater than or equal to four, then the measured pseudo-ranges can be processed to determine the user's single point location as represented by a vector $X=(x, y, z)^T$, as well as to compensate for the receiver clock offset.

GNSS finds particular application in the field of surveying, which requires highly accurate measurements. The need to improve positioning accuracies has eventually led to the development of differential navigation/positioning. In this mode, the user position is determined relative to an antenna connected to a base receiver or a network of base receivers with the assumption that the positional coordinates of the base receiver(s) are known with high accuracy. The base receiver or receiver network transmits its measurements (or corrections to the full measurements) to a mobile navigation receiver (or rover). The rover receiver uses these corrections to refine its measurements in the course of data processing. The rationale for this approach is that since the pseudo-range measurement errors on the base and rover sides are strongly correlated, using differential measurements will substantially improve positioning accuracy.

SUMMARY

In some embodiments, a handheld GNSS device having a GNSS antenna, memory, and a display receives a first GNSS signal at the GNSS antenna and determines a first position of a point of interest based on the GNSS signal. The first position is stored in memory. A second GNSS signal is received at the GNSS antenna and a second position of the point of interest is determined based on the second GNSS signal. The second position is stored in memory. A third GNSS signal is received at the GNSS antenna and a third position of the point of interest is determined based on the third GNSS signal. The third position is stored in memory. A determination is made whether the first, second, and third positions meet a clustering criteria. In accordance with a determination that the first, second, and third positions meet the clustering criteria, a first cluster position is stored. The first cluster position is based on the first, second, and third positions. In accordance with a determination that the first and second positions meet the clustering criteria and the third position does not meet the clustering criteria, a second cluster position is stored. The second cluster position is based on the first and second and not the third position.

BRIEF DESCRIPTION OF THE DRAWINGS

FIGS. 7-19 depict a series of screen shots of an interface for clustering positions.

In the following description, reference is made to the accompanying drawings which form a part thereof, and which illustrate several examples of the present disclosure. It is understood that other examples may be utilized and structural and operational changes may be made without departing from the scope of the present disclosure. The use of the same reference symbols in different drawings indicates similar or identical items.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the technology as claimed. Thus, the various embodiments are not intended to be limited to the examples described herein and shown, but are to be accorded the scope consistent with the claims.

Systems and methods for performing land surveying using RTK engine verification are provided. In one example, a first set of positions of a GNSS receiver may be determined using each of a plurality of RTK engines. If a number of the plurality of RTK engines that produce a fixed solution is greater than or equal to a threshold value, a position of the GNSS receiver may be determined based on at least a portion of the first set of positions. The determined position may then be stored. This process may be repeated any number of times to produce a desired number of stored positions. In response to the number of stored positions being equal to a minimum value, a final position of the GNSS device may be determined based on the stored positions.

Figure 1:
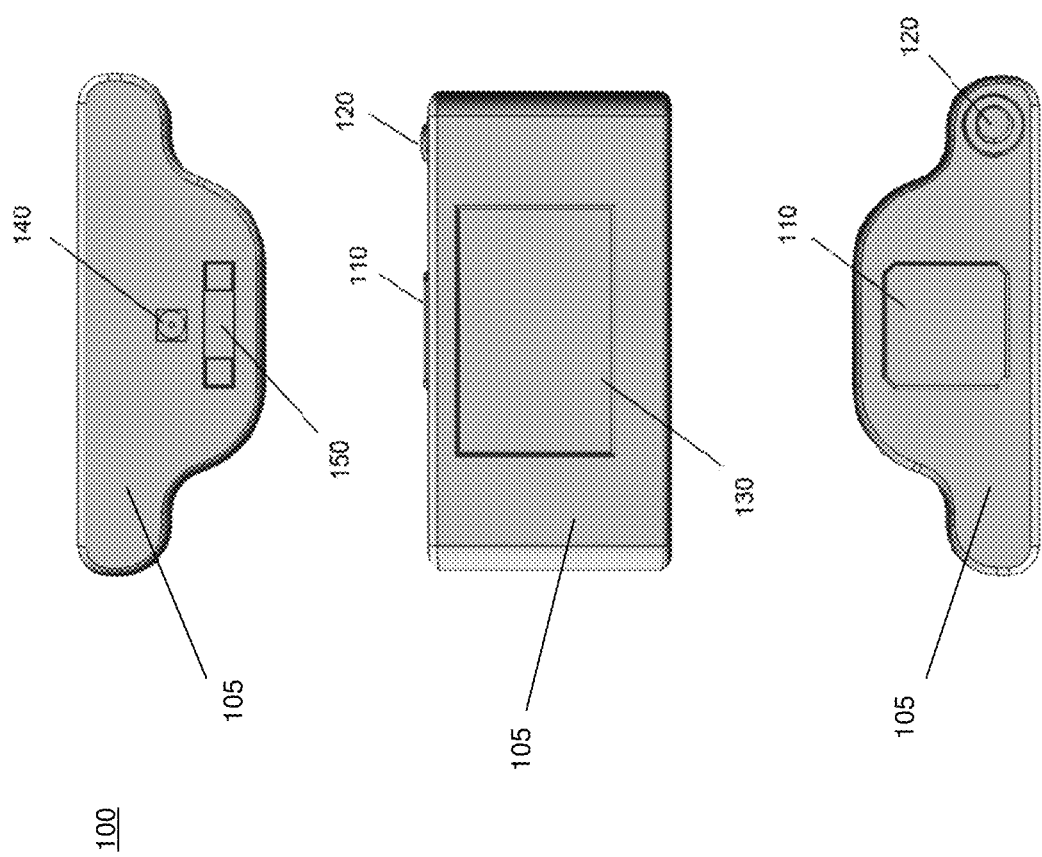
FIG. 1 illustrates an exemplary graphics-aided geodesic device viewed from various angles.

FIG. 1 illustrates an exemplary graphics-aided geodesic device 100 viewed from various angles. Graphics-aided geodesic device 100 is shown contained within camera housing 105. Camera housing 105 allows the user to hold graphics-aided geodesic device 100 as one would hold a typical camera. In one example, the device may include GNSS antenna 110 which may receive signals transmitted by a plurality of GNSS satellites and used by graphics-aided geodesic device 100 to determine position. In one example, GNSS antenna may receive signals transmitted by at least 4 GNSS satellites. In the example shown by FIG. 1, GNSS antenna 110 is located on the top side of graphics-aided geodesic device 100.

Graphics-aided geodesic device 100 may further include a GNSS receiver (not shown) for converting the signal received by GNSS antenna 110 into Earth-based coordinates, for example, World Geodetic System 84(WGS84), Earth-Centered Earth Fixed (ECEF), local east, north, up coordinates (ENU), and the like. Such receivers are well-known by those of ordinary skill in the art and any such device may be used.

Graphics-aided geodesic device 100 may further include "measure" button 120 to cause the device to perform a position measurement. In one example, this button may be similar to that of a conventional camera. However, instead of taking a photograph, "measure" button 120 may cause graphics-aided geodesic device 100 to perform a position measurement as described in greater detail below. In the example shown by FIG. 1, "measure" button 120 is located on the top side of graphics-aided geodesic device 100.

Graphics-aided geodesic device 100 may further include display 130 for displaying information to assist the user in positioning the device. Display 130 may be any electronic display such as a projection display, a liquid crystal (LCD) display, light emitting diode (LED) display, a plasma display, and the like. Such display devices are well-known by those of ordinary skill in the art and any such device may be used. In the example shown by FIG. 1, display 130 is located on the back side of graphics-aided geodesic device 100.

Graphics-aided geodesic device 100 may further include camera 140 for recording still images or video. Such recording devices are well-known by those of ordinary skill in the art and any such device may be used. In the example illustrated by FIG. 1, camera 140 is located on the bottom side of graphics-aided geodesic device 100. A more detailed description of the positioning of camera 140 will be provided below with respect to FIGS. 2A-C. In one example, display 130 may be used to display the out put of camera 140. Thus, when held upright, display 130 displays a view of the ground located below graphics-aided geodesic device 100.

Graphics-aided geodesic device 100 may further include horizon sensors (not shown) for determining the orientation of the device. The horizon sensors may be any type of horizon sensor, such as an inclinometer, accelerometer, and the like. Such horizon sensors are well-known by those of ordinary skill in the art and any such device may be used. In one example, a representation of the output of the horizon sensors may be displayed using display 130. A more detailed description of display 130 is provided below. Horizon sensors 215 and 216 are illustrated in FIGS. 2A-2C and FIG. 3.

The horizon sensors 215 and 216, by determining the inclination of the geodesic device 100, allow a CPU to compensate for errors resulting from the mis-leveling of the geodesic device 100. A user taking a position measurement may position the geodesic device 100 so that it is not level with respect to a plane parallel to the horizon. However, the CPU 360 (FIG. 3) of the geodesic device 100, receiving orientation data from the horizon sensors 215 and 216, can compensate the position determination as long as the inclination of the geodesic device 100 is below an inclination threshold. In this way, the orientation data, indicating the orientation of the GNSS antenna 110, may be used by the CPU 360 to correct for errors in the position data received by the GNSS antenna 360. (The position determination and compensation by the CPU 360 is generally discussed below). For example, a geodesic device 100 may be configured to have an inclination error of 15 degrees. As such, if the inclination of the geodesic device 100 is between 0 to 15 degrees with respect to a plane parallel to the horizon, the CPU 360 will determine the position of the point of interest.

Furthermore, the horizon sensors 215 and 216 determining the inclination of the geodesic device 100 with respect to a plane parallel with the horizon may be used to determine when the CPU 360 of the geodesic device 100 determines the position of a point of interest. The horizon sensors 215 and 216 measure the inclination of the geodesic device 100 with respect to a plane parallel to the horizon. The CPU 360 automatically begins determining the position of a point of interest when the inclination of the geodesic device 100 enters a predetermined inclination range. The CPU 360 continues determining position of the point of interest as long as the inclination of the geodesic device 100 is within the predetermined inclination range. If the inclination is measured to be outside the predetermined inclination range, the CPU 360 suspends determining the position of the point of interest. For example, the user of the geodesic device 100 may indicate that a position measurement should be taken at an inclination of 0 to 15 degrees from a plane parallel with the horizon. When the user holding the geodesic device 100 positions the geodesic device at 5 degrees, the position measurement by the CPU 360 starts automatically. Similarly, when the user tilts the geodesic device 100 so the inclination is no longer within the range of 0 to 15 degrees, the CPU 360 suspends the position measurement. In other words, the user may set a predetermined inclination range at which the CPU 360 will initiate the position measurement. Thus, by measuring the inclination of the geodesic device 100 during positioning by the user, the position measurement by the CPU 360 starts and stops depending on the positioning and orientation of the geodesic device 100. In this way, the user does not need to activate the position determination by depressing a start and stop key, for example. Moreover, the user does not need to search for a start or stop button to take a position measurement when environmental conditions, such as bright sunlight and darkness, may make it challenging for the user to find specific soft keys or hard buttons, respectively.

Moreover, if the horizon sensors 215 and 216 determines the inclination to be more than a predetermined threshold inclination, the CPU 360 deactivates buttons and touch display screen so that they do not respond to user actuation input or inadvertently activated. The CPU 360 deactivates, or locks, the function of buttons and the touch screen when the horizon sensors 215 and 216 determine the geodesic device 100 is inclined more than a predetermined threshold inclination. In one example, the buttons and display screen of the geodesic device 100 locks when the horizon sensors 215 and 216 determines the inclination of the geodesic device 100 is more than 30 degrees.

Graphics-aided geodesic device 100 may further include distance sensor 150 to measure a linear distance. Distance sensor 150 may use any range-finding technology, such as sonar, laser, radar, and the like. Such distance sensors are well-known by those of ordinary skill in the art and any such device may be used. In the example illustrated by FIG. 1, distance sensor 150 is located on the bottom side of graphics-aided geodesic device 100.

Figure 2A:
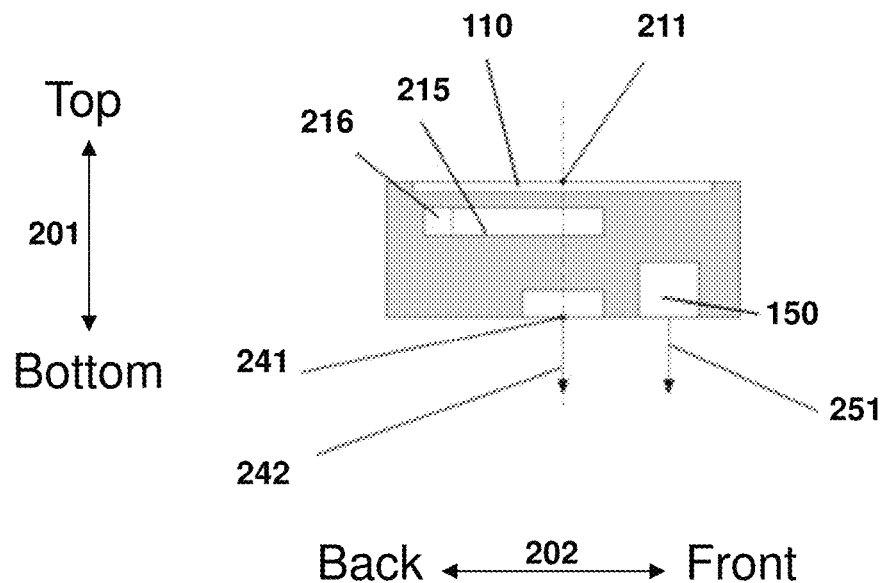
FIG. 2A illustrates an exemplary view of the orientation of the components of a graphics-aided geodesic device.
Figure 2B:
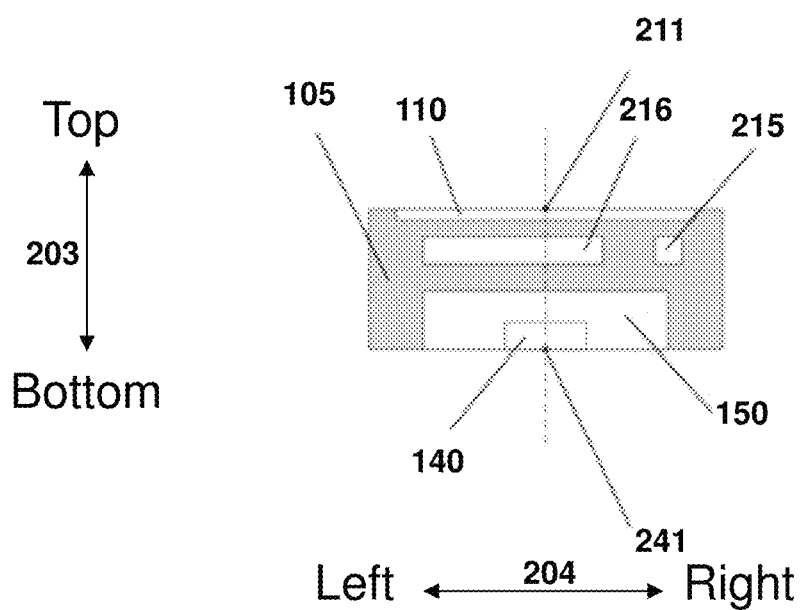
FIG. 2B illustrates another exemplary view of the orientation of the components of a graphics-aided geodesic device.
Figure 2C:
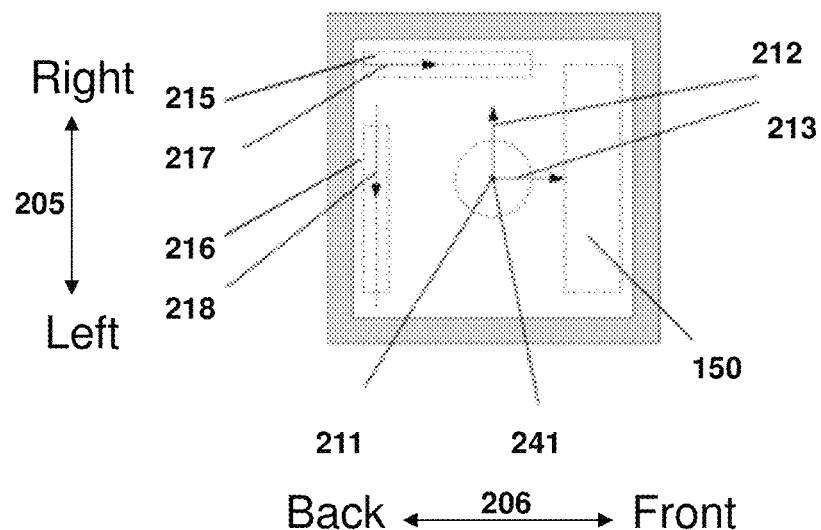
FIG. 2C illustrates yet another exemplary view of the orientation of the components of a graphics-aided geodesic device.

FIGS. 2A-C illustrate exemplary views of graphics-aided geodesic device 100 and the orientation of its components from various angles. FIG. 2A shows a side view of graphics-aided geodesic device 100 with arrows 201 and 202 indicating the top/bottom and front/back of the device, respectively. FIG. 2B shows graphics-aided geodesic device 100 viewed from the back with arrows 203 and 204 indicating the top/bottom and left/right side of the device, respectively. FIG. 2C shows a bottom view of graphics-aided geodesic device 100 with arrows 205 and 206 indicating the right/left side and front/back of the device, respectively.

In the examples illustrated by FIGS. 2A-C, camera housing 105 contains antenna 110, horizon sensors 215 and 216, distance sensor 150, and camera 140. The orientation of the components will be described herein with the use of vectors which indicate a direction in space. For instance, antenna 110 has an antenna ground plane defined by antenna phase center 211 and two ground plane vectors 212 and 213. In one example, ground plane vectors 212 and 213 are parallel or substantially parallel to the local horizon. Camera 140 has optical center 241 located along camera optical axis 242. Camera optical axis 242 passes through antenna phase center 211 and is orthogonal or substantially orthogonal to ground plane vectors 212 and 213. Distance sensor 150 has distance sensor main axis (measuring direction) 251 which is parallel or substantially parallel to camera optical axis 242. Horizon sensors 215 and 216 have orthogonal or substantially orthogonal measurement vectors 217 and 218 which create a plane parallel or substantially parallel to the antenna ground plane defined by ground plane vectors 212 and 213. It should be appreciated that in a real-world application, the components of graphics-aided geodesic device 100 may not be positioned exactly as described above. For instance, due to manufacturing imperfections, the orientations of certain components may not be parallel or orthogonal to the other components as designed. The tolerances for the orientations of the various components depend on the desired precision of the resulting position measurement.

Figure 3:
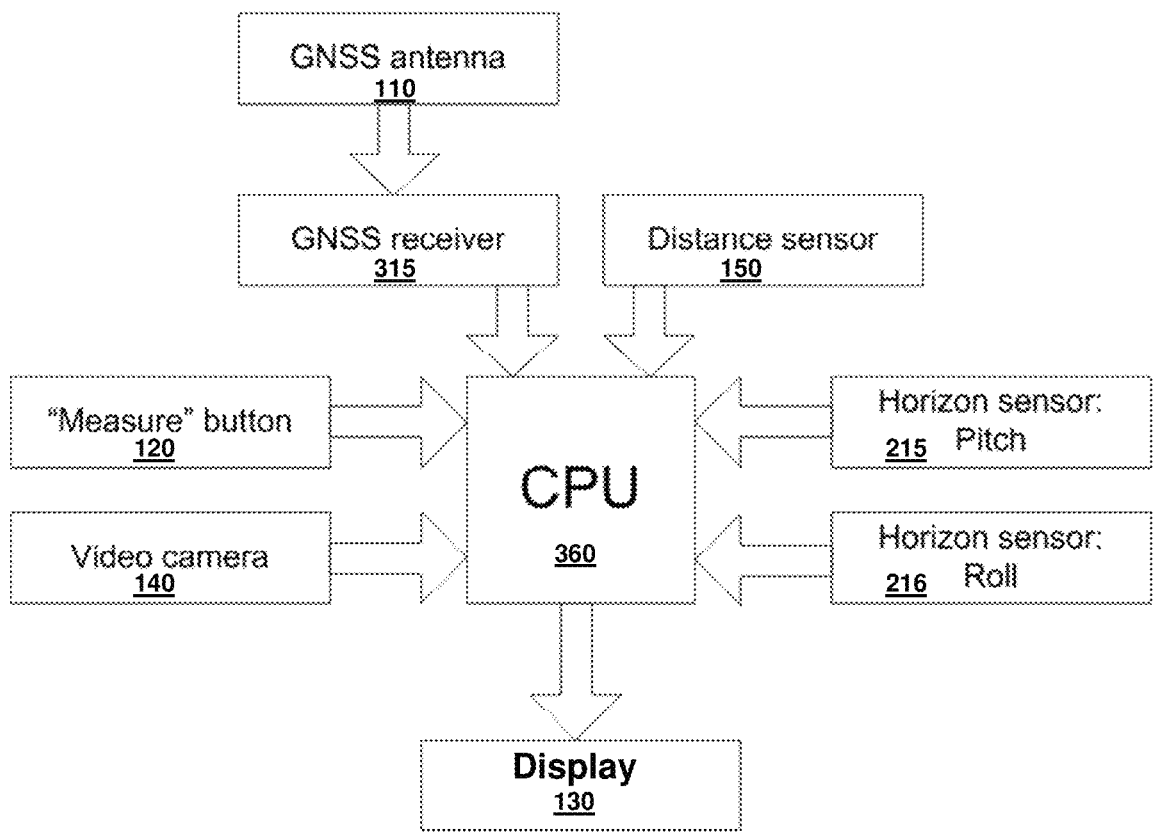
FIG. 3 illustrates an exemplary logic diagram showing the relationships between the various components of a graphics-aided geodesic device.

FIG. 3 illustrates an exemplary logic diagram showing the relationships between the various components of graphics-aided geodesic device 100. In one example, GNSS antenna 110 may send position data received from GNSS satellites to GNSS receiver 315. GNSS receiver 315 may convert the received GNSS satellite signals into Earth-based coordinates, such as WGS84, ECEF, ENU, and the like. GNSS receiver 315 may further send the coordinates to CPU 360 for processing along with distance data from distance sensor 150, pitch data from pitch horizon sensor 215, roll data from roll horizon sensor 216, a measure command from "measure" button 120, and image data from video camera 140. CPU 360 processes the data as will be described in greater detail below and provides display data to be displayed on display 130. The GNSS receiver may also include one or more communication interfaces (not shown) as discussed in detail below. These communication interfaces may be used to transmit and receive position data, correction signals, and other data.

Figure 4:
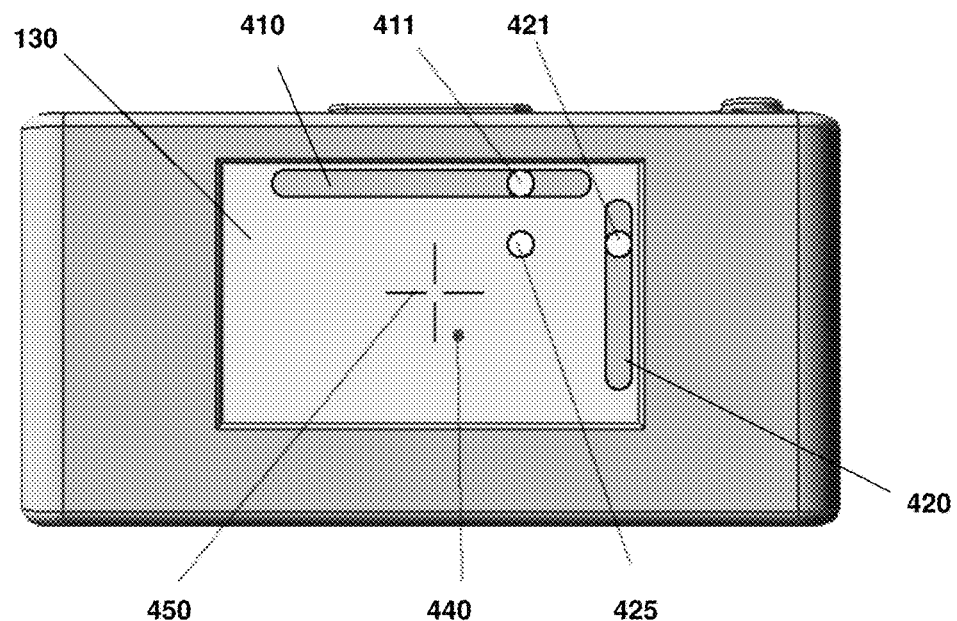
FIG. 4 illustrates an exemplary view of the display screen of a graphics-aided geodesic device including elements used for positioning the device.

FIG. 4 illustrates an exemplary view 400 of display 130 for positioning graphics-aided geodesic device 100. In one example, display 130 may display the output of camera 140. In this example, the display of the output of camera 140 includes point of interest marker 440. As shown in FIG. 4, point of interest marker 440 is a small circular object identifying a particular location on the ground. In the examples provided herein, we assume that the location to be measured is located on the ground and that the point of interest is identifiable by a visible marker (e.g., point of interest marker 440). The marker may be any object having a small height value. For instance, an "X" painted on ground or a circular piece of colored paper placed on the point of interest may serve as point of interest marker 440.

In another example, display 130 may further include virtual linear bubble levels 410 and 420 corresponding to the roll and pitch of graphics-aided geodesic device 100, respectively. Virtual linear bubble levels 410 and 420 may include virtual bubbles 411 and 421 which identify the amount and direction of roll and pitch of graphics-aided geodesic device 100. Virtual linear bubble levels 410 and 420 and virtual bubbles 411 and 421 may be generated by CPU 360 and overlaid on the actual image output of camera 140. In one example, positioning of virtual bubbles 411 and 421 in the middle of virtual linear bubble levels 410 and 420 indicate that the device is positioned "horizontally." As used herein, "horizontally" refers to the orientation whereby the antenna ground plane is parallel to the local horizon.

In one example, data from horizon sensors 215 and 216 may be used to generate the linear bubble levels 410 and 420. For instance, sensor data from horizon sensors 215 and 216 may be sent to CPU 360 which may convert a scaled sensor measurement into a bubble coordinate within virtual linear bubble levels 410 and 420. CPU 360 may then cause the display on display 130 of virtual bubbles 411 and 421 appropriately placed within virtual linear bubble levels 410 and 420. Thus, virtual linear bubble levels 410 and 420 may act like traditional bubble levels, with virtual bubbles 411 and 421 moving in response to tilting and rolling of graphics-aided geodesic device 400. For example, if graphics-aided geodesic device 100 is tilted forward, bubble 420 may move downwards within virtual linear bubble level 420. Additionally, if graphics-aided geodesic device 100 is rolled to the left, virtual bubble 411 may move to the right within virtual linear bubble level 410. However, since virtual linear bubble levels 410 and 420 are generated by CPU 360, movement of virtual bubbles 411 and 421 may be programmed to move in any direction in response to movement of graphics-aided geodesic device 100.

In another example, display 130 may further include planar bubble level 425. Planar bubble level 425 represents a combination of virtual linear bubble levels 410 and 420 (e.g., placed at the intersection of the bubbles within the linear levels) and may be generated by combining measurements of two orthogonal horizon sensors (e.g., horizon sensors 215 and 216). For instance, scaled measurements of horizon sensors 215 and 216 may be converted by CPU 360 into X and Y coordinates on display 130. In one example, measurements from horizon sensor 215 may be used to generate the X coordinate and measurements from horizon sensor 216 may be used to generate the Y coordinate of planar bubble level 425.

As shown in FIG. 4, display 130 may further include central crosshair 450. In one example, central crosshair 450 may be placed in the center of display 130. In another example, the location of central crosshair 450 may represent the point in display 130 corresponding to the view of camera 140 along optical axis 242. In yet another example, placement of planar bubble level 425 within central crosshair 450 may correspond to graphics-aided geodesic device 100 being positioned horizontally. Central crosshair 450 may be drawn on the screen of display 130 or may be electronically displayed to display 130.

Display 130 may be used to aid the user in positioning graphics-aided geodesic device 100 over a point of interest by providing feedback regarding the placement and orientation of the device. For instance, the camera output portion of display 130 provides information to the user regarding the placement of graphics-aided geodesic device 100 with respect to objects on the ground. Additionally, virtual linear bubble levels 410 and 420 provide information to the user regarding the orientation of graphics-aided geodesic device 100 with respect to the horizon. Using at least one of the two types of output displayed on display 130, the user may properly position graphics-aided geodesic device 100 without the use of external positioning equipment.

In the example illustrated by FIG. 4, both point of interest marker 440 and planar bubble level 425 are shown as off-center from central crosshair 450. This indicates that optical axis 242 of camera 140 is not pointed directly at the point of interest and that the device is not positioned horizontally. If the user wishes to position the device horizontally above a particular point on the ground, the user must center both planar bubble level 425 and point of interest marker 440 within central crosshair 450 as shown in FIG. 5.

Figure 5:
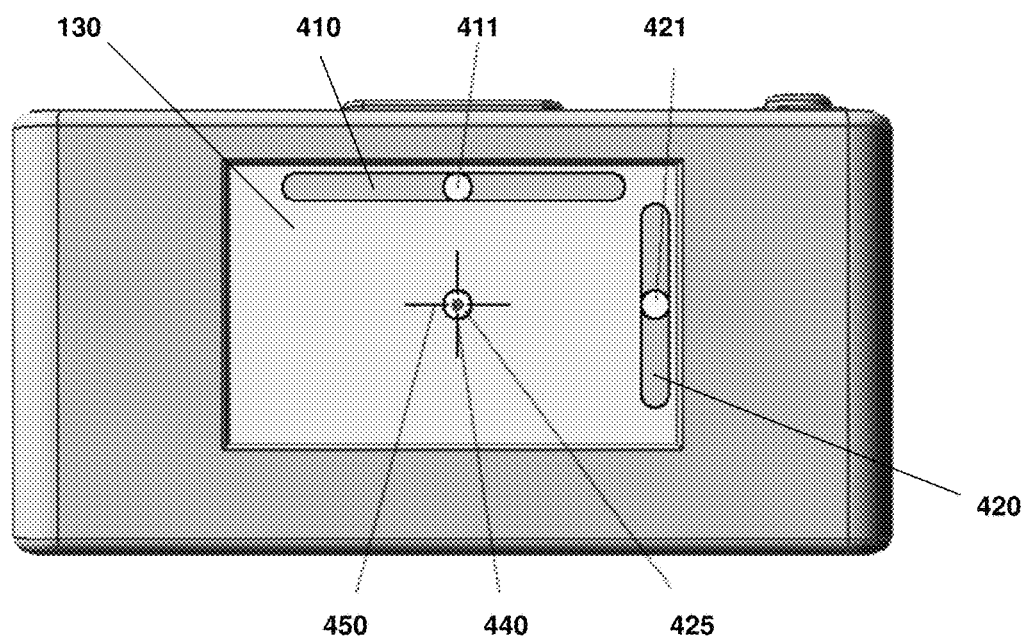
FIG. 5 illustrates another exemplary view of the display screen of a graphics-aided geodesic device oriented horizontally and above a point of interest.

FIG. 5 illustrates another exemplary view 500 of display 130. In this example, virtual linear bubble levels 410 and 420 are shown with their respective bubbles centered, indicating that the device is horizontal. As such, planar bubble level 425 is also centered within central crosshair 450. Additionally, in this example, point of interest marker 440 is shown as centered within central crosshair 450. This indicates that optical axis 242 of camera 140 is pointing towards point of interest marker 440. Thus, in the example shown by FIG. 5, graphics-aided geodesic device 100 is positioned horizontally above point of interest marker 440.

As discussed above with respect to FIG. 2, antenna phase center 211 may be located along optical axis 242. This means that in the example shown by FIG. 5, antenna phase center 211 is also located directly above point of interest marker 440. Thus, the only difference between the position of antenna phase center 211 and point of interest marker 440 is a vertical component equal to the vertical distance between point of interest marker 440 and antenna phase center 211. In this example, the position of point of interest marker 440 may be calculated using the following equation:

$$\vec{P}_x = \vec{P}_{dev} - \vec{n}(D_{in} + D_{out}) \quad (1)$$

Where:

$\vec{P}_x$—Calculated position of the point of interest.

$\vec{P}_{dev}$—Measured GNSS position of the device antenna phase center.

$\vec{n}$—Unit vector orthogonal to the ground.

$D_{in}$—Vertical distance between antenna phase center 211 and the zero measurement point of distance sensor 150.

$D_{out}$—Distance measured by distance sensor 150 from the sensor's zero measurement point to an object along distance sensor main axis 251.

As shown above, $\vec{P}_x$ of equation (1) represents the calculated position of the point of interest. $\vec{P}_{dev}$ represents the position of antenna phase center 211 determined by graphics-aided geodesic device 100. $\vec{n}$ represents a unit vector pointing in a direction orthogonal to the ground. $D_{in}$ represents the vertical distance between antenna phase center 211 and the zero measurement point of distance sensor 150. The zero measurement point of distance sensor 150 is the point in space for which distance sensor 150 is configured to return a zero value and may be located either inside or outside of graphics-aided geodesic device 100. Thus, $D_{in}$ is a constant value that is specific to each graphics-aided geodesic device 100. Finally, $D_{out}$ represents the distance measured by distance sensor 150 from the sensor's zero measurement point to an object along distance sensor main axis 251. Therefore, $\vec{P}_x$ is calculated by taking the position measured by graphics-aided geodesic device 100 and subtracting a vertical distance equal to the distance measured by distance sensor 150 plus the distance between antenna phase center 211 and the zero measurement point of distance sensor 150.

It should be appreciated that the coordinates used in equation (1) may be expressed in any coordinate system. For example, the above described equation may be applicable to any Cartesian coordinate system and the measurement results may be converted to any Earth-based coordinates, such as WGS84, ECEF, ENU, and the like. Such conversion methods are well-known by those of ordinary skill in the art.

A more detailed description of determining a position based on signals from GNSS satellites and base stations is available in U.S. patent application Ser. No. 12/070,333, filed Feb. 15, 2008, published as U.S. Patent Publication No. 2008/0208454 and Ser. No. 12/360,808, filed Jan. 27, 2009, published as U.S. Patent Publication No. 2009/0189804 assigned to the assignee of the present invention, and each of which are incorporated herein by reference in their entirety for all purposes.

Many jurisdictions dictate that surveyors using RTK revisit critical cadastral points several times in order to demonstrate the results of the survey are reliable. These sorts of mandates are meant to trap inevitable errors encountered while pushing GNSS technology to the limits of operability under canopy or nearby obstructions. Producing the same bad coordinate multiple times (such as three observations, separated by several hours) is still possible considering that the base coordinates could be mis-entered, the base receiver could be setup on the wrong point and possible centering and leveling errors at the base and the rover. Many systems are available that implement procedures to reduce the risk associated with the base coordinates being mis-entered or the base receiver being setup on the wrong point, proving that smart technology can help surveyors minimize commonly encountered blunders.

Available systems can quickly fix and then force a loss of fix for a user defined number of times to prove the point being collected was not the result of a bad fix. In as little as a few seconds, these types of verification processes provide confidence to surveyors that their positions are defensible and reliable. Many RTK users today, desiring to prove RTK results are valid, must collect a point, then manually reset the RTK engine, collect a second point and then compare the first to the second to determine if there is acceptable agreement. This is a tedious and time consuming process that provides one single check on the fixed integer ambiguities.

Even with exhaustive verification procedures, the legal obligation in some locales for surveyors to revisit a point hours later remains. Embodiments of the present invention make evaluation of these repeat visits automated and simple. Once a surveyor has collected a point several times, he can initiate cluster averaging, such as in process 600 below, which searches the points that are visible in the database and finds all occurrences of points that meet a clustering criteria, such as being within a user defined range of one another. These occurrences are referred to as "Clusters." The user may be notified of the number of clusters found in the database with the option to create an average point for each cluster. A graphic representation of each cluster may be provided, along with the extreme spread of the points in the cluster expressed in North, East and Up. Finally, a rich report may be provided with vital statistics of each point used to create the cluster and for the resulting average point. All of this may be done automatically, with minimal user involvement.

Figure 6:
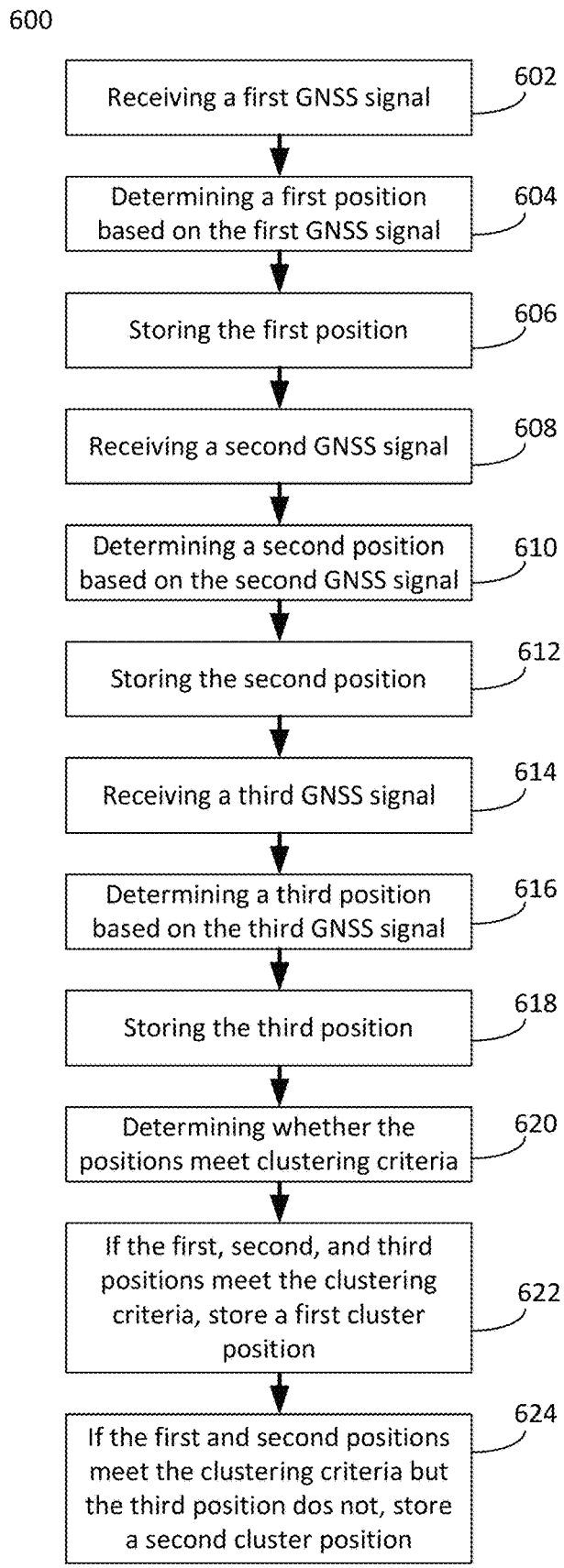
FIG. 6 illustrates an exemplary process for determining clustering positions.

FIG. 6 is a flowchart for process 600 for clustering GNSS positions for a point of interest. At block 602 graphics-aided geodesic device 100 receives a first GNSS signal (e.g., from a plurality of GNSS satellites) at an antenna of the graphics-aided geodesic device.

At block 604 graphics-aided geodesic device 100 determines a first position for a point of interest (e.g., the point under the device or in some location relative to the device) based on the first GNSS signal.

At block 606 graphics-aided geodesic device 100 stores the first position in memory (e.g., RAM, flash, hard drive, etc.). In some examples, the position data may be stored in a database.

At block 608 graphics-aided geodesic device 100 receives a second GNSS signal (e.g., from a plurality of GNSS satellites) at the antenna of the graphics-aided geodesic device. The second GNSS signal may be received without having moved the geodesic device or after the user has moved the geodesic device to other locations to take other measurements and then returned to the point of interest.

At block 610 graphics-aided geodesic device 100 determines a second position for the point of interest (e.g., the point under the device or in some location relative to the device) based on the second GNSS signal. The second position is for the same point of interest as the first position. While the second position is for the same point of interest as the first position, the second position may be slightly different due, for example, to atmospheric variations, interference from other sources, and other environmental variables that have changed since the first GNSS signal was received.

At block 612 graphics-aided geodesic device 100 stores the first position in memory (e.g., RAM, flash, hard drive, etc.). In some examples, the position data may be stored in a database, such as the same database that stores the first position.

At block 614 graphics-aided geodesic device 100 receives a third GNSS signal (e.g., from a plurality of GNSS satellites) at the antenna of the graphics-aided geodesic device. The third GNSS signal may be received without having moved the geodesic device or after the user has moved the geodesic device to other locations to take other measurements and then returned to the point of interest.

At block 616 graphics-aided geodesic device 100 determines a third position for the point of interest (e.g., the point under the device or in some location relative to the device) based on the third GNSS signal. The third position may be for the same point of interest as the first position. If the third position is for the same point of interest as the first position, the third position may be slightly different due, for example, to atmospheric variations, interference from other sources, and other environmental variables that have changed since the first GNSS signal was received.

At block 618 graphics-aided geodesic device 100 stores the third position in memory (e.g., RAM, flash, hard drive, etc.). In some examples, the position data may be stored in a database, such as the same database that stores the first position.

At block 620 graphics-aided geodesic device 100 determines whether the first position, the second position, and the third position meet clustering criteria. This may be done in response to a request for the user. Alternatively, this may be done automatically by the geodesic device. Clustering criteria may take on various forms. For example, the clustering criteria may be a maximum distance between positions. Clustering criteria may also be based on a maximum distance between position along with other parameters, such as time the positions were taken, parameters and characteristics of the position (e.g., the error associated with a position). Clustering criteria can also include parameters based on a maximum radius for cluster as well as other parameters.

At block 622, if the first, second, and third positions meet the clustering criteria, a cluster position is determined and stored. The cluster position may be the average of these three positions. The cluster position may also include other position data that meets the clustering criteria or be some other mathematical function of positions that meet the clustering criteria. Additional metadata may be stored for the cluster position that indicates the positions that are included in the cluster position as well as other statistics about the cluster position (e.g., an error parameter).

At block 624, if the first and second positions meet the clustering criteria, but the third position does not, a cluster position is determined based on the first and second positions, but no the third position. The cluster position may then be stored. Additional metadata may be stored for the cluster position that indicates the positions that are included in the cluster position as well as other statistics about the cluster position (e.g., an error parameter).

FIGS. 7-19 depict various screen shots of a user interface for clustering positions of a point of interest determined by a GNSS device.

Figure 7:
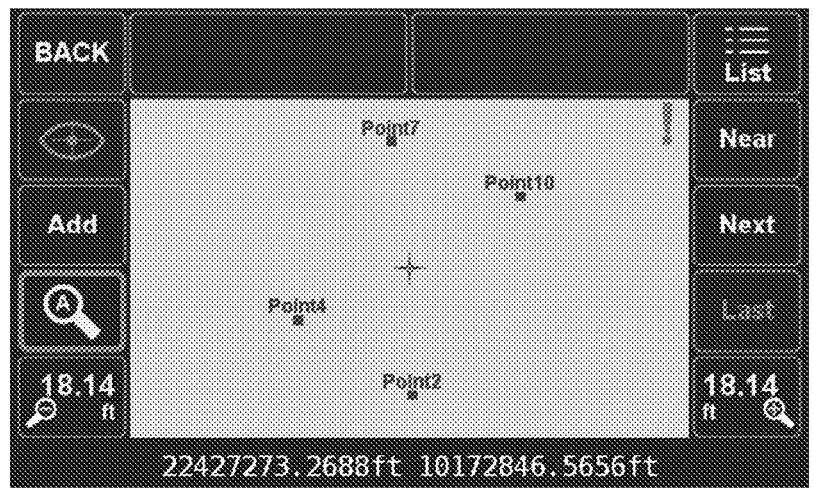
Figure 8:
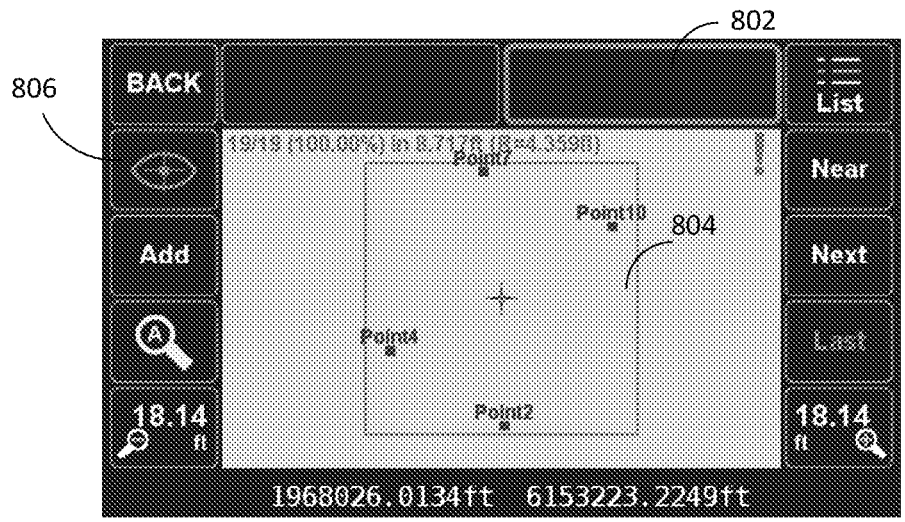

FIG. 7 depicts four groups of surveyed points (notice the dots are bold squares indicating each dot is composed of more than one point). FIG. 8 depicts the result of pressing selection button 802 and shows that there are 19 points within red square 804.

Figure 9:
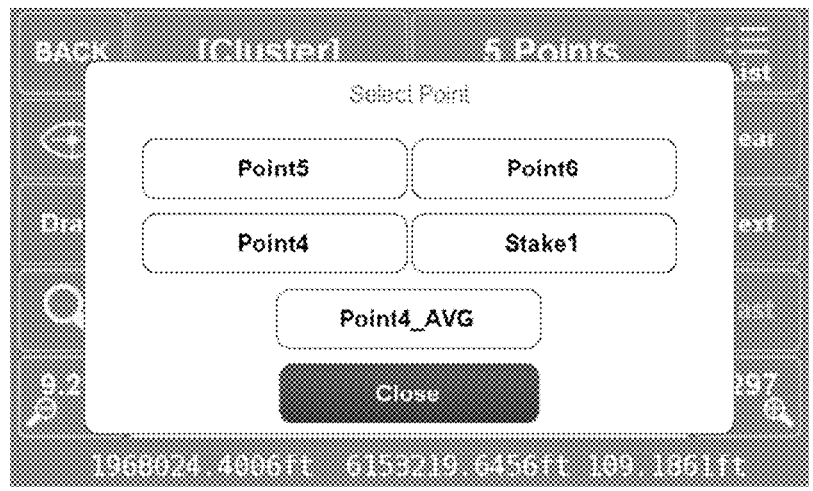

Selecting one of the clusters of points (e.g., by dragging the cursor over one of the clusters of points and pressing Eye/Crosshair icon 806) displays options for points within the Cluster radius, as depicted in FIG. 9. In this example, Point4, Point5 and Point6 are individually surveyed points. Stake1 is a design point, created from entering coordinates. Point4_AVG is an average point created previously created from Cluster Averaging, such as described in process 600.

Figure 10:
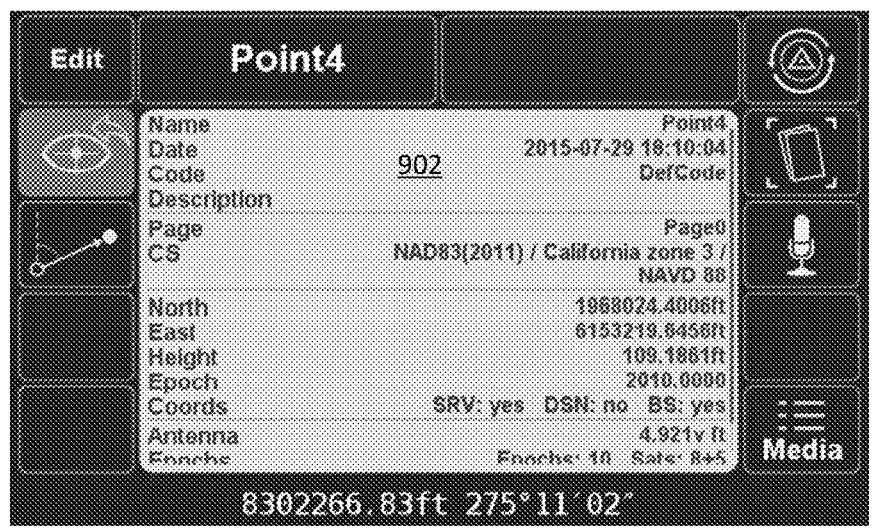
Figure 11:
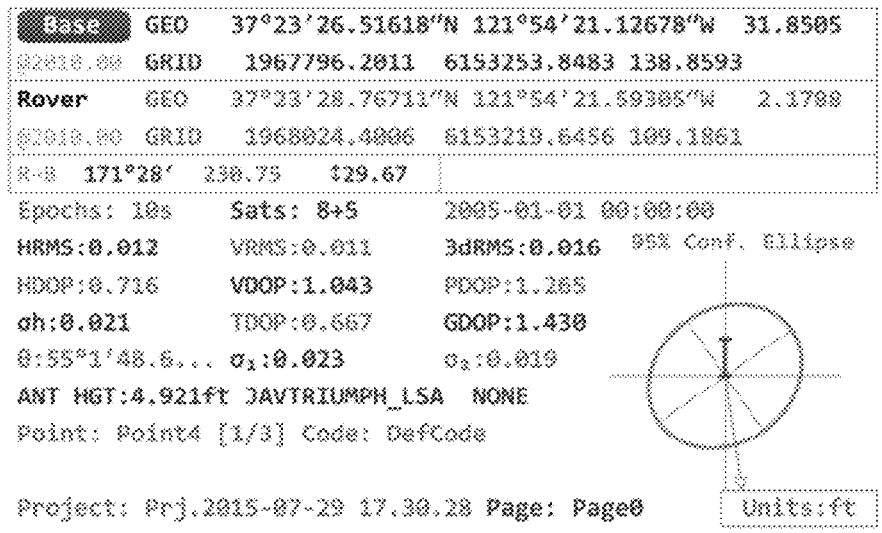

After selecting a point from the cluster in FIG. 9, information for the point is displayed as depicted in FIG. 10. Pressing anywhere on information field 902 shows additional statistics about the selected point, as depicted in FIG. 11.

Figure 12:
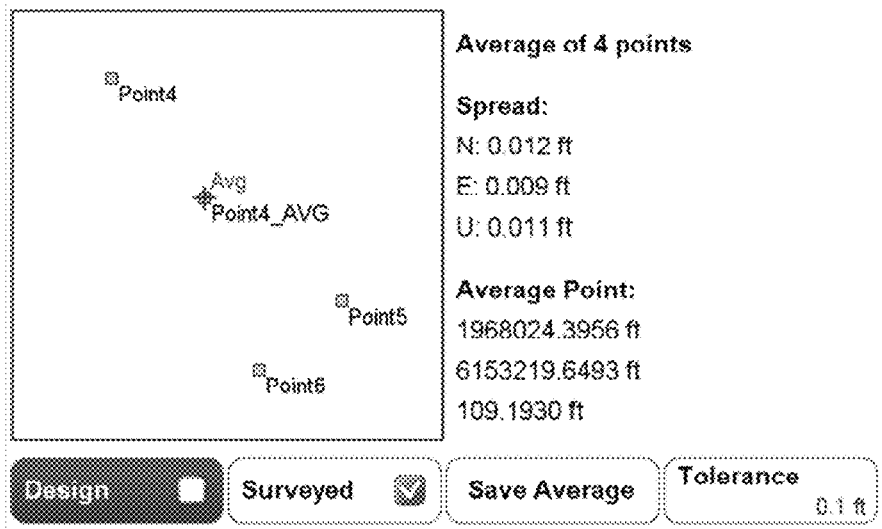
Figure 13:
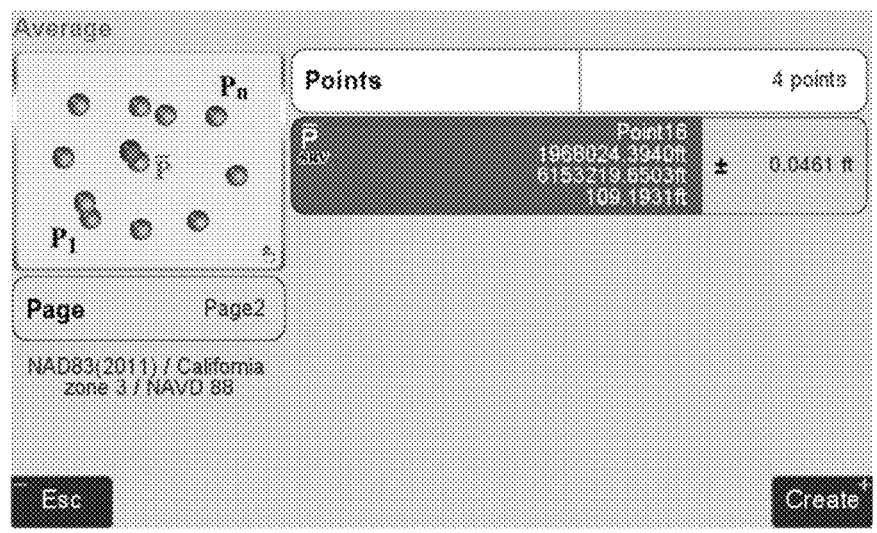
Figure 14:
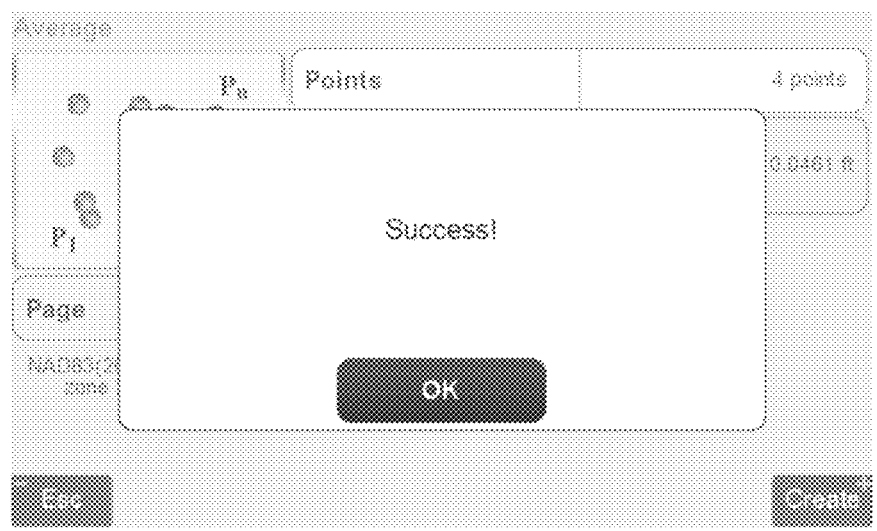

FIG. 12 depicts the Cluster Average Statistics screen. Here the user is given the extreme spread of the cluster of points, the average coordinates (weighted by the error estimates in the case of survey points), with the option to include only surveyed points or only design (imported/calculated) points or a combination. The Tolerance value sets the radius used to define what falls within a cluster. Pressing Save Average displays the Average Tool, as depicted in FIG. 13, for final acceptance of the average, as depicted in FIG. 14.

Figure 15:
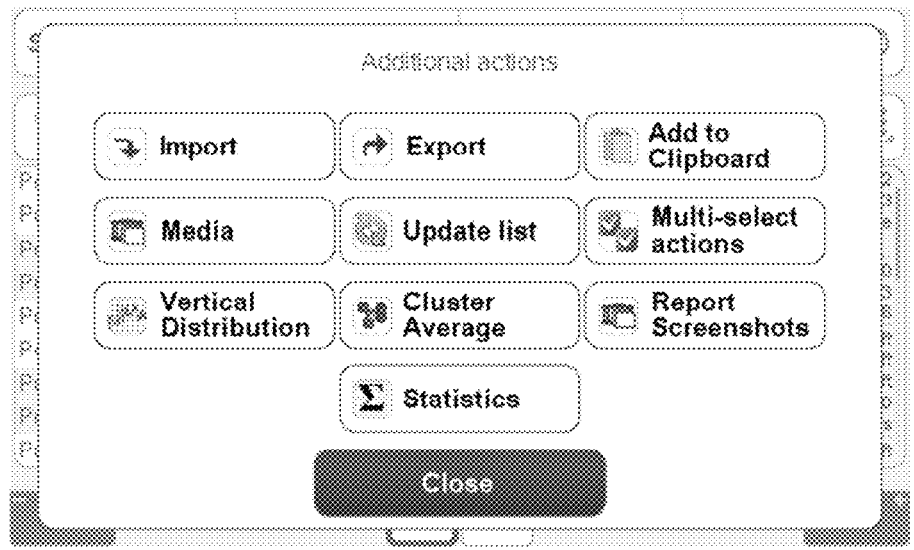
Figure 16:
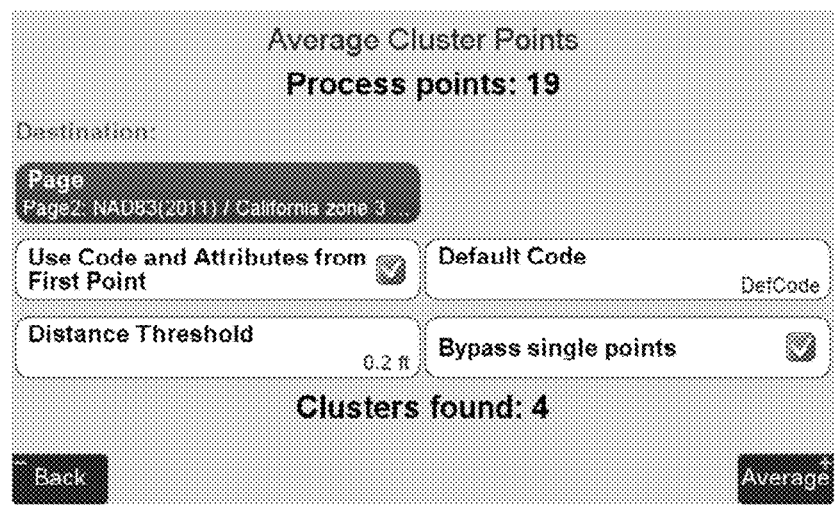
Figure 17:
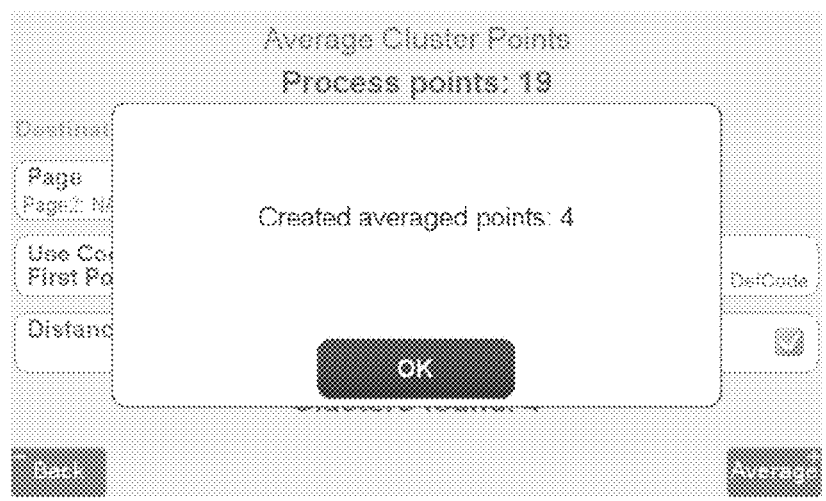

The process described above creates averages from clusters one at a time as the user selects a point in a cluster and initiates the average command from the review screen. Cluster averages can also be created automatically from. For example, as depicted in FIG. 15, a user may select a Cluster Average button that will cause the GNSS device to identify clusters in the points currently visible in the points list (excluding any points that have been filtered from view). The result of this process is depicted in FIG. 16, where 4 clusters were found among 19 points. If, Average is selected, the average point of each detected cluster will be created automatically. The name of the point, by default, is [PointName]_AVG, with [PointName] being the name of the first point detected in the cluster. For example the averaged point from a cluster of points named Point4, Point5 and Point6, will be named Point4_AVE. For efficiency, the Code and Attributes from the first point in the cluster can be assigned to the average point using the appropriate check box, as depicted in FIG. 16. FIG. 17 depicts a confirmation that the average points have been created.

Figure 18:
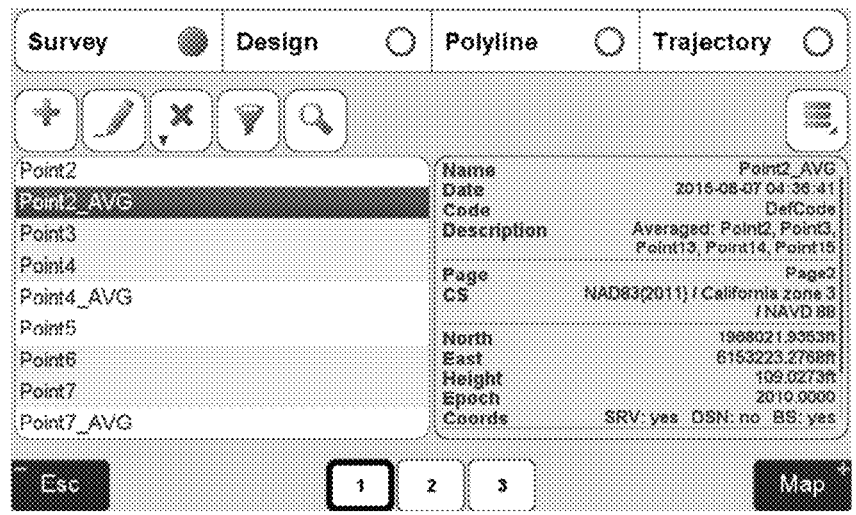

As depicted in FIG. 18, once the points have been created from the Cluster Average Utility, they are visible in the Points Screen. If all of the points used in the Cluster are surveyed points, the resulting Average point is also created as a survey point, having the same number of epochs as the combined epochs from the points in the cluster. The error estimates are modified according to the combination of the errors of the individual points, generally resulting in much improved precision in the Average point. FIG. 19 depicts the statistics for the average point.

Figure 20:
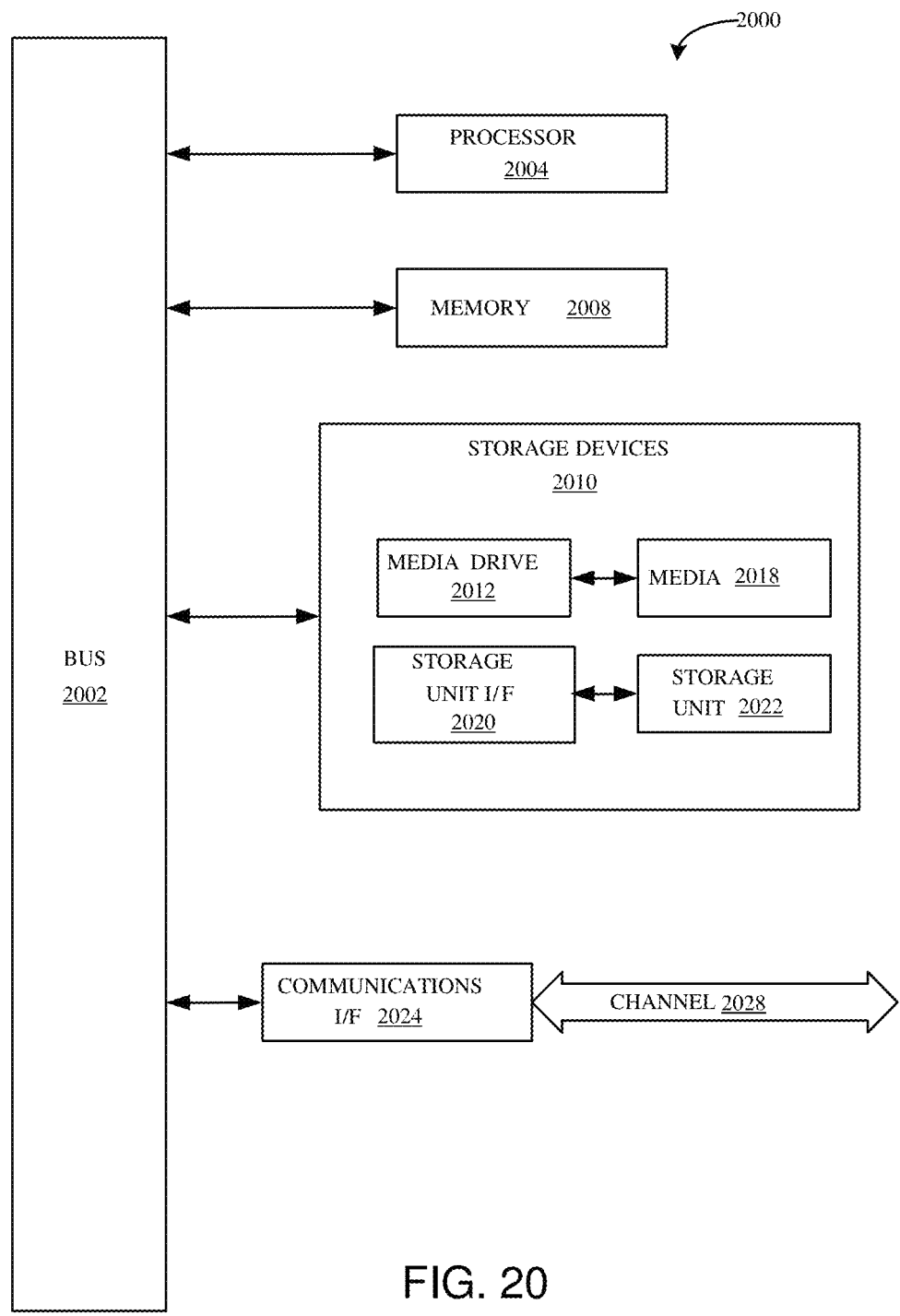
FIG. 20 depicts an exemplary computer system that may be used to implement embodiments of the present invention.

FIG. 20 illustrates an exemplary computing system 2000 that may be employed to implement processing functionality for various aspects of the current technology (e.g., as a geodesic device, receiver, CPU 360, activity data logic/database, combinations thereof, and the like). Those skilled in the relevant art will also recognize how to implement the current technology using other computer systems or architectures. Computing system 2000 may represent, for example, a user device such as a desktop, mobile phone, geodesic device, and so on as may be desirable or appropriate for a given application or environment. Computing system 2000 can include one or more processors, such as a processor 2004. Processor 2004 can be implemented using a general or special purpose processing engine such as, for example, a microprocessor, microcontroller or other control logic. In this example, processor 2004 is connected to a bus 2002 or other communication medium.

Computing system 2000 can also include a main memory 2008, such as random access memory (RAM) or other dynamic memory, for storing information and instructions to be executed by processor 2004. Main memory 2008 also may be used for storing temporary variables or other intermediate information during execution of instructions to be executed by processor 2004. Computing system 2000 may likewise include a read only memory ("ROM") or other static storage device coupled to bus 2002 for storing static information and instructions for processor 2004.

The computing system 2000 may also include information storage mechanism 2010, which may include, for example, a media drive 2012 and a removable storage interface 2020. The media drive 2012 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 2018 may include, for example, a hard disk, floppy disk, magnetic tape, optical disk, CD or DVD, or other fixed or removable medium that is read by and written to by media drive 2014. As these examples illustrate, the storage media 2018 may include a computer-readable storage medium having stored therein particular computer software or data.

In alternative embodiments, information storage mechanism 2010 may include other similar instrumentalities for allowing computer programs or other instructions or data to be loaded into computing system 2000. Such instrumentalities may include, for example, a removable storage unit 2022 and an interface 2020, such as a program cartridge and cartridge interface, a removable memory (for example, a flash memory or other removable memory module) and memory slot, and other removable storage units 2022 and interfaces 2020 that allow software and data to be transferred from the removable storage unit 2018 to computing system 2000.

Computing system 2000 can also include a communications interface 2024. Communications interface 2024 can be used to allow software and data to be transferred between computing system 2000 and external devices. Examples of communications interface 2024 can include a modem, a network interface (such as an Ethernet or other NIC card), a communications port (such as for example, a USB port), a PCMCIA slot and card, etc. Software and data transferred via communications interface 2024 are in the form of signals which can be electronic, electromagnetic, optical, or other signals capable of being received by communications interface 2024. These signals are provided to communications interface 2024 via a channel 2028. This channel 2028 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product" and "computer-readable storage medium" may be used generally to refer to media such as, for example, memory 2008, storage device 2018, or storage unit 2022. These and other forms of computer-readable media may be involved in providing one or more sequences of one or more instructions to processor 2004 for execution. Such instructions, generally referred to as "computer program code" (which may be grouped in the form of computer programs or other groupings), when executed, enable the computing system 2000 to perform features or functions of embodiments of the current technology.

In an embodiment where the elements are implemented using software, the software may be stored in a computer-readable medium and loaded into computing system 2000 using, for example, removable storage drive 2014, drive 2012 or communications interface 2024. The control logic (in this example, software instructions or computer program code), when executed by the processor 2004, causes the processor 2004 to perform the functions of the technology as described herein.

It will be appreciated that, for clarity purposes, the above description has described examples with reference to different functional units and processors. However, it will be apparent that any suitable distribution of functionality between different functional units, processors, or domains may be used. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Furthermore, although individually listed, a plurality of means, elements, or method steps may be implemented by, for example, a single unit or processor. Additionally, although individual features may be included in different claims, these may possibly be advantageously combined, and the inclusion in different claims does not imply that a combination of features is not feasible or advantageous. Also, the inclusion of a feature in one category of claims does not imply a limitation to this category, but rather the feature may be equally applicable to other claim categories, as appropriate.

Although a feature may appear to be described in connection with a particular embodiment, one skilled in the art would recognize that various features of the described embodiments may be combined. Moreover, aspects described in connection with an embodiment may stand alone.

What is claimed is:

1. A method comprising:
   at a handheld GNSS device having a GNSS antenna, memory, and a display:
   receiving a first GNSS signal at the GNSS antenna;
   determining a first position of a point of interest based on the GNSS signal;
   storing the first position in the memory;
   receiving a second GNSS signal at the GNSS antenna;
   determining a second position of the point of interest based on the second GNSS signal;
   storing the second position in the memory;
   receiving a third GNSS signal at the GNSS antenna;
   determining a third position of the point of interest based on the third GNSS signal;
   storing the third position in the memory;
   determining whether the first, second, and third positions meet a clustering criteria;
   in accordance with a determination that the first, second, and third positions meet the clustering criteria, storing a first cluster position, wherein the first cluster position is determined based on the first, second, and third positions; and
   in accordance with a determination that the first and second positions meet the clustering criteria and the third position does not meet the clustering criteria, storing a second cluster position, wherein the second cluster position is determined based on the first and second and not the third position.

2. The method of claim 1 further comprising:
   before determining whether the first, second, and third positions meet the clustering criteria, displaying the first, second, and third positions on the display; and
   after storing the first cluster position, replacing the display of the first, second, and third positions on the display with display of the first cluster position on the display.

3. The method of claim 1 further comprising:
   before determining whether the first, second, and third positions meet the clustering criteria, displaying the first, second, and third positions on the display;
   after storing the second cluster position, replacing the display of the first and second positions on the display with display of the second cluster position on the display while maintaining display of the third position.

4. The method of claim 1, wherein the clustering criteria is based on a distance threshold.

5. The method of claim 1, wherein the clustering criteria is a distance threshold.

6. The method of claim 1 further comprising:
   determining an average of the first, second, and third positions, wherein the first cluster position is the average.

7. The method of claim 1, wherein the first position, the second position, and the third position are stored in a database in the memory.

8. The method of claim 1, wherein determining whether the first, second, and third positions meet the clustering criteria occurs automatically in response to user input.

9. The method of claim 1 further comprising:
   receiving user input indicating a fourth position of the point of interest, wherein the first cluster position is further determined based on the fourth position.

10. The method of claim 1 further comprising:
    receiving user input indicating the clustering criteria.

11. A GNSS device comprising:
    a processor configured to execute instructions;
    a GNSS antenna; and
    memory containing a instructions executable on the processor, the instructions include instructions for performing the steps of:
    receiving a first GNSS signal at the GNSS antenna;
    determining a first position of a point of interest based on the GNSS signal;
    storing the first position in the memory;
    receiving a second GNSS signal at the GNSS antenna;
    determining a second position of the point of interest based on the second GNSS signal;
    storing the second position in the memory;
    receiving a third GNSS signal at the GNSS antenna;
    determining a third position of the point of interest based on the third GNSS signal;
    storing the third position in the memory;
    determining whether the first, second, and third positions meet a clustering criteria;
    in accordance with a determination that the first, second, and third positions meet the clustering criteria, storing a first cluster position, wherein the first cluster position is determined based on the first, second, and third positions; and
    in accordance with a determination that the first and second positions meet the clustering criteria and the third position does not meet the clustering criteria, storing a second cluster position, wherein the second cluster position is determined based on the first and second and not the third position.

12. A non-transitory computer-readable storage medium storing computer executable instructions for execution on a GNSS device with a processor, memory, and a GNSS antenna, the instructions comprising instructions for:
 receiving a first GNSS signal at the GNSS antenna;
 determining a first position of a point of interest based on the GNSS signal;
 storing the first position in the memory;
 receiving a second GNSS signal at the GNSS antenna;
 determining a second position of the point of interest based on the second GNSS signal;
 storing the second position in the memory;
 receiving a third GNSS signal at the GNSS antenna;
 determining a third position of the point of interest based on the third GNSS signal;
 storing the third position in the memory;
 determining whether the first, second, and third positions meet a clustering criteria;
 in accordance with a determination that the first, second, and third positions meet the clustering criteria, storing a first cluster position, wherein the first cluster position is determined based on the first, second, and third positions; and
 in accordance with a determination that the first and second positions meet the clustering criteria and the third position does not meet the clustering criteria, storing a second cluster position, wherein the second cluster position is determined based on the first and second and not the third position.

\* \* \* \* \*